UNITED STATES PATENT OFFICE.

CHRISTIAN RUDOLPH, OF HÖCHST-ON-THE-MAIN, GERMANY, ASSIGNOR TO FARBWERKE, VORMALS MEISTER, LUCIUS & BRÜNING, OF SAME PLACE.

MANUFACTURE OF CINNAMIC ACID.

SPECIFICATION forming part of Letters Patent No. 276,888, dated May 1, 1883.

Application filed July 22, 1882. (Specimens.)

*To all whom it may concern:*

Be it known that I, CHRISTIAN RUDOLPH, of Höchst-on-the-Main, Germany, have invented certain new and useful Improvements in Materials Used in the Manafacture of Artificial Indigo; and I do hereby declare that the following is a full, clear, and exact description of the invention, which will enable others skilled in the art to which it appertains to make and use the same.

My invention relates to the production of cinnamic acid and of substituted cinnamic acids, which are to be used as materials in the manufacture of artificial indigo.

The method for producing cinnamic acid or cinnamic acids substituted in the benzol radical from benzylidenacetone, or from the corresponding substitution products, consists in exposing these acetones to the action of hypochlorides or hypoiodites. The formation of cinnamic acid from benzylidenacetone takes place according to the equation: $C_6H_5.CH.CH.CO.CH_3 + 3NaOCO = C_6H_5.CH.CH.COONa + CHCO_3 + 2NaHO$.

The special method in the production is as follows: I gently heat on a water bath fifteen parts of benzylidenacetone with a solution of forty-eight parts of bromine dissolved in six hundred and fifty parts of soda lye of four per cent. When the presence of hypobromous acid in the solution can no longer be proved the transformation of the acetone into cinnamic acid, as expressed in the above equation, is completed. When the bromoform generated in the process has separated from the aqueous solution I add to it diluted sulphuric acid, collect the separated cinnamic acid, and purify the same by recrystallization in alcohol or water. The derivatives of benzylidenacetone, substituted in the benzol radical, may be used in the production of substituted cinnamic acid by proceeding in a similar manner.

By heating twenty parts of orthonitrobenzylidenacetone, obtainable by the method described in my application for an improvement in the production of artificial indigo, filed in the United States Patent Office April 18, 1882, with eight hundred parts of an aqueous solution of hypochlorite of sodium of three per cent. there may be obtained on working after the method described above nearly the theoretical quantity of orthonitrocinnamic acid.

As above stated, the cinnamic acid and the substituted cinnamic acids are used as material in the manufacture of artificial indigo.

I am aware that hypochlorites have been used in an analogous manufacture, and to such therefore I make no claim.

Having thus described my invention, what I claim as new, and desire to secure by Letters Patent, is—

The herein-described process for producing cinnamic acid, which consists in heating in a water bath benzylidenacetone with bromine dissolved in soda lye, and when the bromoform generated in the process has separated from the aqueous solution diluted sulphuric acid is added, and the separated cinnamic acid is collected and purified by recrystallization with alcohol or water, substantially as set forth.

In testimony that I claim the foregoing as my own I affix my signature in presence of two witnesses.

CHRISTIAN RUDOLPH.

Witnesses:
F. VOGELER,
J. GRUND.